United States Patent [19]
Rask

[11] 3,879,882
[45] Apr. 29, 1975

[54] FISH LURE
[76] Inventor: Oscar J. Rask, 2305 Lee Ave. North, Minneapolis, Minn. 55422
[22] Filed: Aug. 1, 1973
[21] Appl. No.: 384,595

[52] U.S. Cl............................. 43/42.28; 43/43.13
[51] Int. Cl............................................ A01k 85/00
[58] Field of Search....................... 43/42.28, 43.13

[56] References Cited
UNITED STATES PATENTS
1,320,804  11/1919  Squarebriggs..................... 43/43.13
2,577,965  12/1951  Hinkson............................ 43/43.13
3,218,750  11/1965  Lewin............................... 43/42.28

Primary Examiner—Louis G. Mancene
Assistant Examiner—Daniel J. Leach

[57] ABSTRACT

An improved flexible fish lure stabilized for oscillatory motion about its leading end while displaying life-like swimming motion of its trailing end. A rudder member and a connected stabilizer member are attached to or are integrally formed as part of the trailing end of a flexible fish lure body. The rudder and stabilizer members are generally symmetrically disposed about a plane extending through a longitudinal axis of the lure. The rudder member resembles a fish-like fin, and the stabilizer member attached thereto is aerodynamically-shaped and curved in a direction away from the rudder member. When subjected to fluid pressure in a fluid stream, the rudder and stabilizer members cooperatively stabilize oscillatory motion of the lure about its leading end and cause the lure's trailing end to oscillate in a life-like swimming manner.

10 Claims, 7 Drawing Figures

PATENTED APR 29 1975 3,879,882
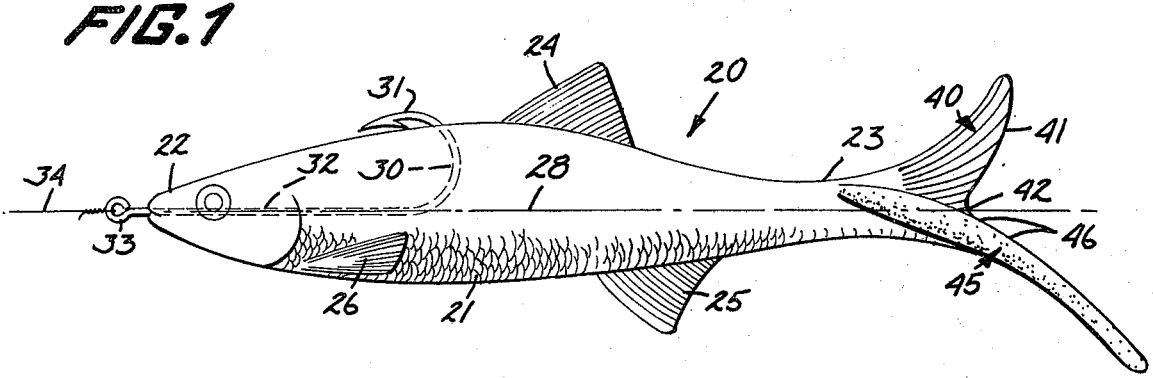
FIG.1
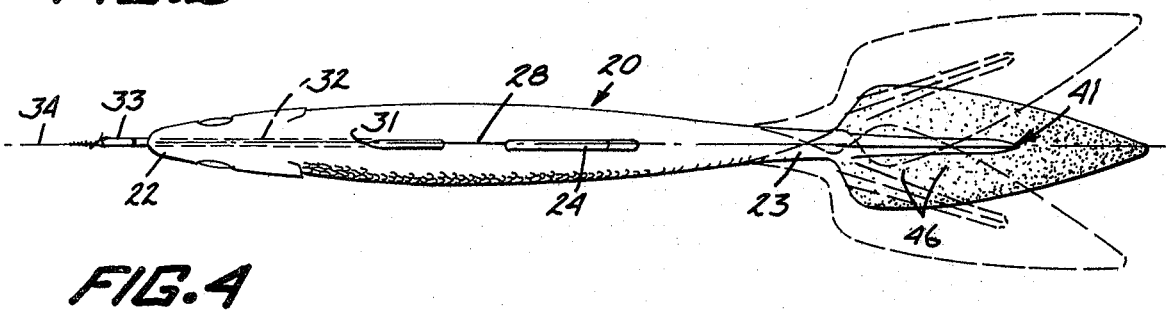
FIG.2
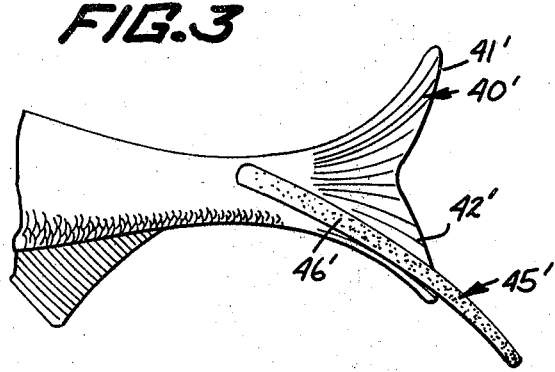
FIG.3
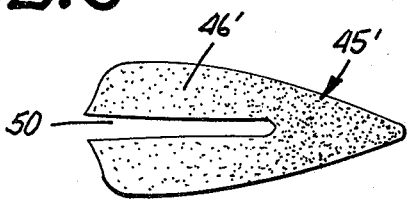
FIG.4
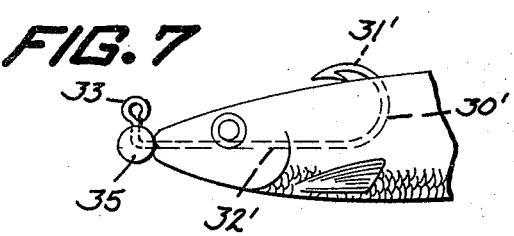
FIG.5
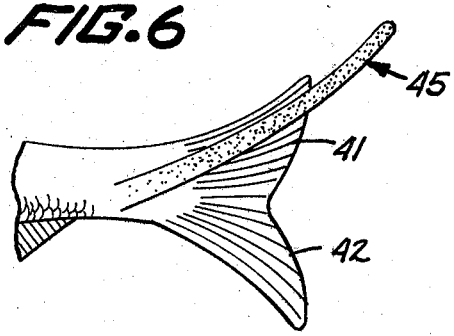
FIG.6
FIG.7

FISH LURE

BACKGROUND OF THE INVENTION

1. Field of the Invention

This invention generally relates to fish lures and more particularly to flexible fish lures with improved trailing characteristics.

2. Description of the Prior Art

Fishermen and fish lure manufacturers have long sought and strived to produce life-like qualities in artificial fish lures. Life-like action of a lure may assume various forms such as darting action, wiggling action, diving action, and the like. In general, the life-like attributes have been instilled into artificial fish lures of the type pulled through water, either by design of their specific structural elements or by choice of the material employed in their fabrication.

Those lures fabricated from non-flexible material have generally employed one of three techniques to achieve the desired motion of the lure. A first technique consists of contouring the lure body, for example in an arched shape, for providing side-to-side motion of the lure when pulled through water. A second general technique for providing darting action of rigid lures has been to place a scoop or inclined member at the leading end of the lure. This technique also can be employed to provide diving action of the lure. Both of these techniques basically provide for oscillatory motion of the lure about its leading end.

A third technique, generally employed with minnow-shaped non-flexible lures, uses a lure hinged near its center for providing a wiggling motion of its trailing part while attempting to stabilize oscillatory motion of the foremost portion of the lure. Such a technique, however, does not provide true life-like motion of the trailing portion of the lure, since such motion is restricted by the hinged element. Further, such a hinged lure is often troublesome in casting, since the hinged portion of the lure often doubles back on the fishing line or binds on the hinge and does not freely trail the leading portion of the lure once it hits the water.

In an attempt to provide artificial lures with more life-like characteristics, the lures have been formed from flexible materials having very pliable characteristics and life-like feel. Artificial minnows, frogs, leeches, worms and the like have been most successfully fabricated from such flexible material. A general problem with such flexible lures has been their tendency to oscillate about their leading ends when pulled through the water, thereby reducing their life-like characteristics.

The present invention overcomes the problems associated with the prior art fish lures by incorporating a unified stabilizing structure at the trailing end of a flexible fish lure for stabilizing oscillatory motion of the lure about its leading end while causing the lure's trailing end to oscillate in a transverse manner simulating life-like swimming motion.

While the present invention will be described in conjunction with its use with a minnow-type artificial lure, it will be understood that the invention is not limited to this use, but can be used with any flexible lure having a leading end generally adapted for connection to a fishing line and a trailing end at which life-like oscillatory motion is desired. Further, while the present invention, as described, uses a particular stabilizing configuration to achieve its functions, it will be understood that the invention is not limited to the use of this particular configuration, but that any functionally equivalent apparatus could be employed without departing from the spirit or intent of this invention.

SUMMARY OF THE INVENTION

The present invention is particularly applicable to flexible fish lures used to simulate minnows, frogs, leeches, worms and the like, characterized by a leading end normally operatively connected to a fish line and a trailing end in which oscillatory swimming motion is desired. The present invention incorporates a novel stabilizing apparatus connected or molded to form an integral part of the trailing end of the fish lure body.

The stabilizing means includes a rudder member connected at the trailing end of the fish lure and forming a continuous streamlined extension thereof and a stabilizer member attached to the rudder member and curved in a direction away from the rudder member. The rudder and stabilizer members are generally symmetrically disposed about a normally vertical plane extending through a longitudinal axis of the lure which extends from the leading end to the trailing end of the lure body. The stabilizer member is aerodynamically tapered from the trailing end of the lure body and extends transverse to the plane.

The transversely extending stabilizer member provides a resistive path for the otherwise streamlined flow of fluid past the trailing end of the lure body and offers a resistive drag to the motion of the lure through the water, thus stabilizing oscillatory motion of the lure about its leading end. The stabilizer member is also cooperatively operable with the rudder member to cause its trailing end to oscillate in a direction generally transverse to the vertical longitudinal plane, simulating life-like swimming action.

It is one object of the present invention, therefore, to provide an improved flexible fish lure.

It is another object of the present invention to provide an improved flexible fish lure having life-like swimming motion of its trailing end and stabilized trailing motion of its leading end.

It is a further object of the present invention to provide a novel stabilizing method and apparatus for simulating life-like swimming motion in a flexible fish lure.

These and other objects of my invention will become apparent to those skilled in the art upon consideration of the accompanying specification, claims and drawings.

BRIEF DESCRIPTION OF THE DRAWINGS

FIG. 1 is a view in side elevation of a preferred embodiment of the present invention;

FIG. 2 is a top plan of the invention disclosed in FIG. 1, illustrating varied relative positions of its trailing end;

FIG. 3 is a partial view in side elevation of the trailing end of a fish lure illustrating an alternate embodiment of the stabilizing means of the present invention;

FIG. 4 is a side elevation of the stabilizer member portion of the alternate embodiment disclosed in FIG. 3;

FIG. 5 is a top plan view of the stabilizer member disclosed in FIG. 4;

FIG. 6 is a partial view of the trailing end of a fish lure illustrating a third embodiment of the stabilizing means of the present invention; and FIG. 7 is a partial view of the leading end of a fish lure illustrating the operative connection thereof to a weighted fish hook.

DESCRIPTION OF THE PREFERRED EMBODIMENT

Referring to the Figures, wherein like numerals represent like parts throughout the several views, there is generally shown in FIG. 1 a fish lure 20 having a lure body generally designated at 21 and including a leading end 22 and a trailing end 23. The lure body 21 extends from its leading end 22 to its trailing end 23 along a longitudinal axis 28 and is generally symmetrical about a vertical plane (not illustrated) extending through the longitudinal axis 28. The fish lure illustrated is minnow-shaped; however, it will be understood that this invention would equally well apply to other lure body shapes such as frogs, leeches, worms, shrimp or the like. In the preferred embodiment, the fish lure 20 is molded from a flexible resilient material such as rubber, capable of providing a life-like feeling and motion to the lure. The lure body 21 of the preferred embodiment also has a dorsal fin 24, an anal fin 25, and impressions of pectoral fins 26 integrally formed in the lure body 21.

A fish hook 30 is imbedded in the lure body 21. The fish hook 30 further has a barb 31 projecting from the top surface of the lure body 21 and also has a shank 32 extending in a forward direction from the leading end 22 of the lure body 21. The shank 32 terminates in an eyelet 33 suitable for connection to a fish line, leader or the like generally designated at 34.

Although the fish hook 30 has been illustrated as projecting from the upper surface of the lure body 21 it will be understood that other hook arrangements could be equally well employed within the spirit and intent of this invention. For example, an alternate hook configuration employing a weighted hook termination 35, is illustrated in FIG. 7. Use of such a weighted hook configuration would cause the fish lure 20 to dive in water under the influence of the weighted portion 35 of the hook 30 and to climb when pulled in a forward direction by the fish line 34.

A rudder member 40 resembling a portion of a caudal fin of a fish is integrally connected to the lure body 21 and forms a streamlined continuation thereof, generally in the vertical plane through the longitudinal axis 28. The rudder member 40 has a first upwardly directed portion 41 and a second downwardly directed portion 42 generally resembling the two portions of a caudal fin of a fish.

A stabilizer member 45 is integrally connected to the rudder member 40 at the trailing end 23 of the lure body 21 and forms an integral extension thereof. In the preferred embodiment, the stabilizer member 45 is generally aerodynamically shaped, having widened portions 46 symmetrically extending transverse and generally perpendicular to the vertical plane extending through the longitudinal axis 28. The stabilizer member 45 is aerodynamically tapered in the longitudinal direction from the trailing end 23 of the lure body 21. The stabilizer member 45 is of arcuate shape, being curved, as illustrated in FIG. 1, in a direction away from the first upwardly directed portion 41 of the rudder member 40. The curvature of the stabilizer member 45 is such that the axis, not shown, about which the stabilizer member 45 is curved, would pass perpendicularly through the vertical plane extending through the longitudinal axis 28, and would be relatively positioned forward of the trailing end 23 of the fish lure 20.

In the embodiment of the stabilizing member of the present invention diagrammatically illustrated in FIG. 3, a stabilizing member 45' is illustrated as it would positionally appear if attached to a rudder member 40' completely resembling a caudal fin of a fish. Such a stabilizer member 45' could, for example, be secured to an existing flexible fish lure 20 already having a caudal fin like rudder member 40' as illustrated. The stabilizer member 45' is arcuately curved about an axis, not shown, positionally located forward of the trailing end of the lure body 21 as previously described. A side sectional view of the stabilizer member 45' is illustrated in FIG. 4. A top elevation of the stablizer member 45' that would be adapted for connection to an existing caudal fin rudder member 40' of a fish lure 20 is illustrated in FIG. 5. An aperture in the nature of a slot 50 is formed in the stabilizer member 45' to enable the stabilizer member 45' to cooperatively engage the rudder member 40'. It will be noted that the stabilizer member 45' could equally well be of solid construction with the aperture 50 being formed in the rudder member 40'.

The stabilizer member 45 could equally well be attached to or integrally formed as a part of the upwardly directed portion 41 of the rudder member 40 as illustrated in FIG. 6. In such a configuration, the stabilizer member 45 would curve away from the second downwardly directed portion 42 of the rudder member 40 about an axis positioned forward of the trailing end 23 of the lure body 21 as previously described.

OPERATION OF THE PREFERRED EMBODIMENT

In the absence of the stabilizing member 45 on a minnow-shaped flexible lure, the lure would tend to oscillate when pulled through water by means of a fish line 34, about its leading end 22. The transversely extending widened portions 46 of the stabilizer member 45 provide a resistive path to the water and, create a drag on the fish lure 20 and on the fishing line 34, tending to stabilize oscillations of the fish lure 20 about its leading end 22. The arcuately shaped stabilizer member 45 in cooperation with the rudder member 40 are also forced by the water in a transverse direction to the vertical plane extending through the longitudinal axis 28 as the lure 20 is pulled through the water in a forward direction, causing the trailing end 23 of the lure body 21 to oscillate in a transverse manner about the vertical plane. This oscillatory motion is illustrated by the dashed line positions of the trailing end of the lure and the stabilizer and rudder members 45 and 40 respectively in FIG. 2. The oscillatory motion of the trailing end 23 of the lure thus caused, simulates life-like swimming motion. Identical life-like swimming action is obtained by the inverted stabilizer member configuration illustrated in FIG. 6.

The stabilizing member 45 and rudder member 40 combination, as above described, may be equally well applied to the trailing end of flexible lures 20 of other configurations such as worm-shaped, leech-shaped, and frog-shaped flexible lures, and has been found to produce similar results on such lures.

While I have disclosed a specific embodiment of my invention, it is to be understood that this is for the pur-

What is claimed is:

1. An improved fish lure, comprising:
   a. a lure body, formed from a flexible material, longitudinally extending along a lure axis, said body terminating at a leading end and at a trailing end opposite said leading end;
   b. a rudder member integrally connected to and longitudinally extending from the trailing end of the lure body, said rudder member lying in a plane extending through said lure axis; and
   c. stabilizer means symmetrically disposed on opposite sides of said plane, transversely extending from said lure body proper near its said trailing end and longitudinally extending with and rearward of said rudder member and cooperating therewith for stabilizing oscillatory motion of said lure body about its said leading end while causing smooth life-like transverse oscillatory movement of its said trailing end.

2. An improved fish lure according to claim 1, wherein said stabilizer means transversely extends generally perpendicular to said plane.

3. An improved fish lure according to claim 2, wherein said stabilizer means comprises an arcuate stabilizer member curved in a direction away from said rudder member.

4. An improved fish lure according to claim 3, wherein said stabilizer member is aerodynamically tapered in the longitudinal direction away from said lure body.

5. An improved fish lure according to claim 3, wherein said stabilizer member is formed of a material flexibly responsive to water resistance applied thereto when the fish lure is operatively moved through water.

6. An improved fish lure according to claim 2, wherein said rudder member resembles a caudal fin of a fish, said rudder member having upwardly and downwardly directed rudder member portions, and wherein said stabilizer means is positionally connected to longitudinally extend with said upwardly directed portion of the rudder member.

7. An improved fish lure according to claim 2, wherein said rudder member resembles a caudal fin of a fish, said rudder member having upwardly and downwardly directed rudder member portions, and wherein said stabilizer is positionally connected to longitudinally extend with said downwardly directed portion of the rudder member.

8. An improved flexible fish lure, comprising:
   a. a minnow-shaped lure body formed from flexible material, said body having a leading end suitable for connection to a fish line and a trailing end, opposite said leading end, and terminating in a caudal fin-like member, said caudal fin-like member having first and second divergently extending portions; and
   b. a transversely extending stabilizer member connected to said lure body proper near its said trailing end and longitudinally extending with said first diverging extended portion of said caudal fin-like member for cooperating with said fin-like member to stabilize oscillatory motion of said lure body about its leading end while causing smooth life-like oscillation of its trailing end.

9. An improved flexible fish lure according to claim 8, wherein said lure body, said caudal fin-like member and said stabilizer member are generally symmetrically disposed about a vertical plane and wherein said stabilizer member is aerodynamically shaped and curved in a direction away from said second diverging portion of said fin-like member, said stabilizer member and said caudal fin-like member when placed in a fluid stream cooperatively causing said life-like oscillations of the trailing end of the lure body in a direction which is transverse and generally perpendicular to said plane.

10. A method of stabilizing the trailing motion of a flexible fish lure through water by reducing its oscillatory motion about a leading end thereof while causing life-like oscillation of said trailing end, comprising the steps of providing a rudder member in one plane at the trailing end of said fish lure and securing an arcuate stabilizing member to said lure body proper near its said trailing end and to said rudder member, such that the stabilizing member extends rearward of said rubber member and transversely of and symmetrically about said plane and curves away from said rudder member.

* * * * *